United States Patent
Goldmeer et al.

(10) Patent No.: US 7,128,624 B1
(45) Date of Patent: Oct. 31, 2006

(54) RECHARGEABLE OPEN CYCLE UNDERWATER PROPULSION SYSTEM

(75) Inventors: Jeffrey S. Goldmeer, Latham, NY (US); William H. Girodet, Palm Beach Gardens, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 28 days.

(21) Appl. No.: 11/117,009

(22) Filed: Apr. 28, 2005

(51) Int. Cl.
*B63H 11/00* (2006.01)

(52) U.S. Cl. ......................................... 440/38; 114/337
(58) Field of Classification Search ................ 114/337; 440/38, 45, 47
See application file for complete search history.

(56) References Cited

U.S. PATENT DOCUMENTS

| | | | | |
|---|---|---|---|---|
| 3,779,200 | A * | 12/1973 | Hull | 440/42 |
| 4,057,961 | A * | 11/1977 | Payne | 60/221 |
| 4,341,173 | A | 7/1982 | Hagelberg et al. | |
| 6,484,491 | B1 * | 11/2002 | Thordarson | 60/211 |
| 6,610,193 | B1 | 8/2003 | Schmitman | |
| 6,978,617 | B1 * | 12/2005 | Goldmeer et al. | 60/698 |
| 2003/0013356 | A1 * | 1/2003 | Burns | 440/38 |
| 2003/0153216 | A1 | 8/2003 | Van-Drentham-Susman et al. | |

* cited by examiner

*Primary Examiner*—Stephen Avila
(74) *Attorney, Agent, or Firm*—Scully, Scott, Murphy & Presser, P.C.

(57) ABSTRACT

In an underwater vehicle, hydrogen and oxygen are fed into a combustion chamber of a combustor of the underwater vehicle to initiate a combustion reaction, which generates high-pressure steam. The high-pressure steam can be cooled with the injection of seawater, and can be condensed into high-pressure water by the addition of sufficient seawater. High-pressure water is then ejected out of the combustor, generating thrust for the underwater vehicle. Sensors that measure the combustor pressure and the external pressure could be used to adjust the combustor pressure, allowing for constant velocity as the depth of the underwater vehicle changes. Alternatively, the sensors could adjust the area of an exit nozzle of the combustor. Stored water can be converted back into hydrogen and oxygen by using electrical power external to the system. After regeneration of the water into hydrogen and oxygen, the propulsion system would be ready for operation again.

32 Claims, 3 Drawing Sheets

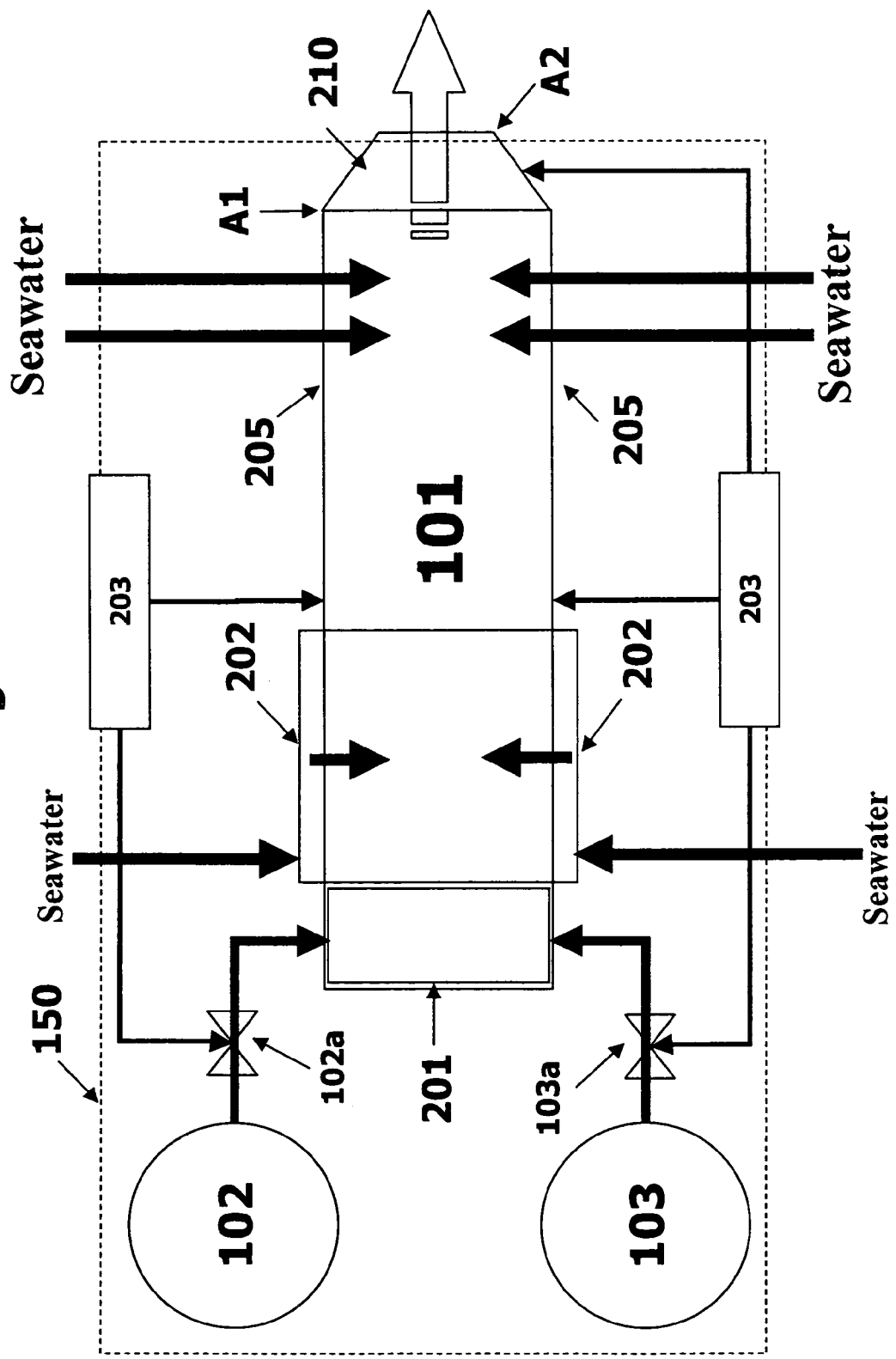

RECHARGEABLE OPEN CYCLE UNDERWATER PROPULSION SYSTEM

BACKGROUND OF THE INVENTION

1. Field of the Invention

The present invention relates to power generation systems for marine vessels, and more specifically, to an integrated open cycle propulsion system for an underwater vessel.

2. Prior Art

Vehicles that operate underwater are useful for performing tasks below the sea surface in such fields as deep-water salvage operations, navy and marine operations, underwater telecommunications, offshore petroleum and mining, and oceanographic research. Many of these applications are completed by small-scale underwater vehicles that can be either manned or unmanned (remotely operated). These unmanned vehicles are commonly known as Unmanned Underwater Vehicles (UUVs).

Generally, these small-scale underwater vessels have used a variety of conventional propulsion systems. Some of the traditional power/propulsion generation systems are closed loop, such as U.S. Pat. No. 6,610,193, requiring complex components to capture the exhaust stream and to generate power. These components (turbines, condensers, generators, etc.) can be quite large and massive, taking up significant space and slowing down the underwater vessel because of their weight. In these conventional propulsion systems, the power generated is used to power motors that are used to power the external propellers and generate thrust. The high-pressure stream into the turbine can be generated using a combustion reaction.

Some traditional propulsion generation systems use complex fuels, such as methane or other hydrocarbons, or oxidizers, such as hydrogen peroxide, to generate the exhaust stream, such as in U.S. Patent Publication No. 2003/0153216, and may have environmentally unfriendly exhaust products ejected into the ocean. These compounds require specific safety practices and may not be easy to replace while in the field (out at sea).

Other conventional propulsion generation systems use pump jets that ingest seawater and then use electrically powered pumps to push water out of the vehicle to generate thrust, such as in U.S. Pat. No. 4,341,173. In these propulsion generation systems, the electrical system used to power the pumps (batteries) would have to be recharged and/or replaced.

Large underwater vessels typically do not require a high speed mode. High speed is usually only required for underwater weapon systems, such as torpedoes, which are not re-used and are expendable underwater vessels. Torpedoes use electrical and combustion based systems to generate power/thrust. The propulsion systems have included thrust based systems that eject high pressure water, or propeller based systems.

However, none of the prior art provides for a propulsion system that can provide a high speed for a marine vessel without adding significant weight to the vessel, and without using any complex fuels that may cause safety concerns. Accordingly, there is a need for a propulsion generation system for a marine vessel that provides for a high speed mode for large submersible vessels, without the drawbacks found in the prior art.

SUMMARY OF THE INVENTION

Therefore, it is an object of the present invention to provide a propulsion generation system for an underwater vehicle that provides for a high speed mode for the underwater vehicle, while maintaining mechanical simplicity with a low mass and avoiding safety concerns. Furthermore, it is another object of the present invention to be able to recharge or regenerate the propulsion generation system quickly and simply.

Accordingly, a propulsion generation system for an underwater vehicle is provided. The propulsion generation system for an underwater vehicle comprises a hydrogen supply, an oxygen supply, a combustor in fluid communication with the hydrogen supply and oxygen supply, the combustor forming high-pressure steam from a combustion reaction in the combustor between hydrogen from the hydrogen supply and oxygen from the oxygen supply, means for condensing the high-pressure steam into high pressure water, and means for ejecting the high-pressure water from the combustor to generate thrust for the underwater vehicle.

The means for condensing can comprises a condenser, and the means for condensing can include injecting seawater into the condenser. The condenser can be within the combustor, or exterior to the combustor.

The propulsion generation system for an underwater vehicle further comprises a regenerative fuel cell in fluid communication with the hydrogen supply and the oxygen supply for powering the underwater vehicle separately or in combination with the combustor. The regenerative fuel cell uses the hydrogen from the hydrogen supply and oxygen from the oxygen supply to generate direct current electricity to drive a propulsion system for the underwater vehicle.

The combustor can comprise a constant pressure system, or a constant volume system. The constant volume system can comprise a Pulse Detonation Engine, which can use a Deflagration to Detonation transition based system.

The propulsion generation system for an underwater vehicle further comprises one or more pressure sensors for monitoring a pressure around an exterior of the underwater vehicle and a combustion pressure within the combustor.

The means for ejecting the high-pressure water can comprise a nozzle of the combustor, which can be a condensing eductor nozzle to increase the amount of thrust generated for the underwater vehicle, or a variable geometry nozzle.

The propulsion generation system for an underwater vehicle further comprises an electrolyzer for breaking down water from a water supply into hydrogen and oxygen. The hydrogen is stored in the hydrogen supply and the oxygen is stored in the oxygen supply. The electrolyzer uses electricity from an outside power supply to reduce the water in the water supply into hydrogen and oxygen. The underwater vehicle can be either manned or unmanned.

Further, a propulsion generation method for an underwater vehicle is provided, the method comprising initiating a combustion reaction between hydrogen and oxygen to form high-pressure steam in a combustor as a product of the combustion reaction, condensing the high-pressure steam in the combustor into high-pressure water, and ejecting the high-pressure water out of the combustor to generate thrust for the underwater vehicle. The condensing step can comprise injecting seawater into the combustor.

The propulsion generation method for an underwater vehicle further comprises simultaneously powering the underwater vehicle by a regenerative fuel cell, and generating direct current electricity from the regenerative fuel cell to drive a propulsion system of the underwater vehicle. The propulsion generation method for an underwater vehicle further comprises monitoring pressure around an exterior of the underwater vehicle and a combustion pressure within the combustor.

The propulsion generation method for an underwater vehicle further comprises increasing the thrust of the underwater vehicle as depth increases to maintain a constant velocity, which comprises increasing combustor pressure by increasing the amount of the hydrogen and oxygen used in the combustion reaction, or increasing the injection pressure of the hydrogen and oxygen used in the combustor. The propulsion generation method for an underwater vehicle further comprises decreasing the thrust of the underwater vehicle as depth decreases to maintain a constant velocity, which comprises decreasing combustor pressure by decreasing amounts of the hydrogen and oxygen in the combustion reaction, or decreasing the injection pressure of the hydrogen and oxygen in the combustor.

The propulsion generation method for an underwater vehicle further comprises using a nozzle of the combustor to eject the water out of the combustor, which can be a condensing eductor nozzle, or a variable geometry nozzle.

The propulsion generation method for an underwater vehicle further comprises breaking down water from a water supply into hydrogen and oxygen. The propulsion generation method for an underwater vehicle further comprises using electricity from an outside power supply to break down the water from the water supply into hydrogen and oxygen.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

FIG. 3 illustrates a detailed schematic representation of another type of combustor for the propulsion generation system for an underwater vehicle of FIG. 1.

DETAILED DESCRIPTION OF THE INVENTION

Although this invention is applicable to numerous and various types of propulsion generation systems for marine vessels, it has been found particularly useful in the environment of propulsion generation systems for underwater vehicles and UUVs. Therefore, without limiting the applicability of the invention to underwater vehicles, the invention will be described in such environment.

Figure 1:
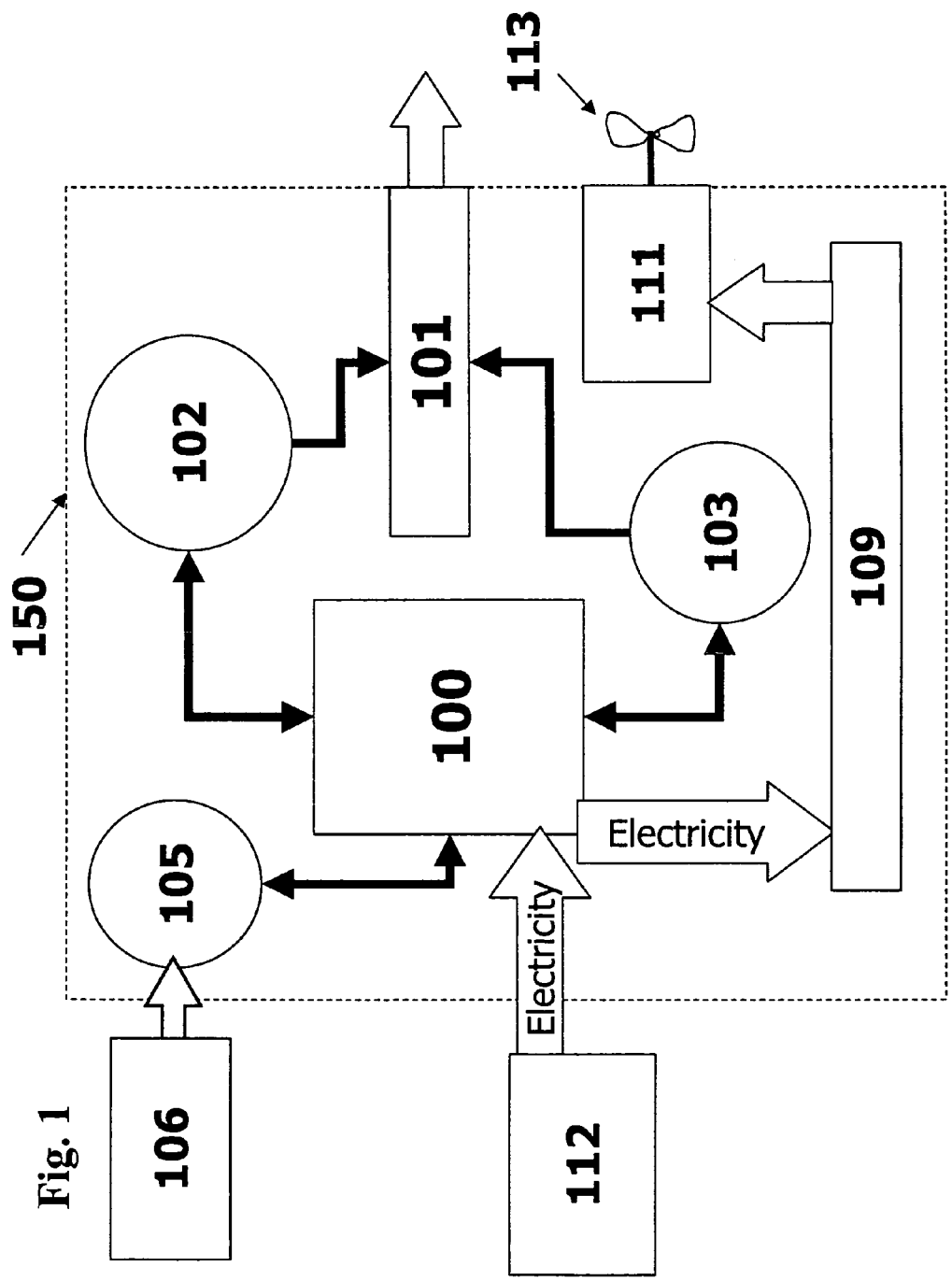
FIG. 1 illustrates a schematic representation of a propulsion generation system for an underwater vehicle.

With reference to FIG. 1, there is a schematic representation of a propulsion generation system for an underwater vehicle 150. Hydrogen is stored in a hydrogen supply 102 and oxygen is stored in an oxygen supply 103. The hydrogen supply 102 and oxygen supply 103 could be pressurized tanks containing the fuel and oxidizer, respectively, with the related control and safety elements required (not shown) to control the mass flow, pressure, etc.

The hydrogen supply 102 and the oxygen supply 103 are in fluid communication with a regenerative fuel cell 100. Overboard water 106 can be brought inside the underwater vehicle 150, through appropriate piping and filtering as required, and can be stored in a water supply 105. The water supply 105 is in fluid communication with the regenerative fuel cell 100. The hydrogen and oxygen gases stored in the hydrogen supply 102 and the oxygen supply 103, respectively, are the reactants for the regenerative fuel cell 100.

The hydrogen and oxygen flow into the regenerative fuel cell 100, which produces direct current electricity and water. The electricity is provided to a DC bus 109, and the water is stored in the water supply 105 for later conversion back into hydrogen ($H_2$) and oxygen ($O_2$). The DC bus 109 supplies power to a variety of devices, including a motor drive 111 that drives the underwater vehicle 150 through a propulsion system 113. This method of propelling the underwater vehicle 150 from the fuel cell 100 through the DC bus 109 to the motor drive 111 can be used when the underwater vehicle 150 requires a nominal power and speed. For high-speed modes, the hydrogen and oxygen are sent to a combustor 101, to generate thrust required for high-speed propulsion, which will be further explained below.

Figure 2:
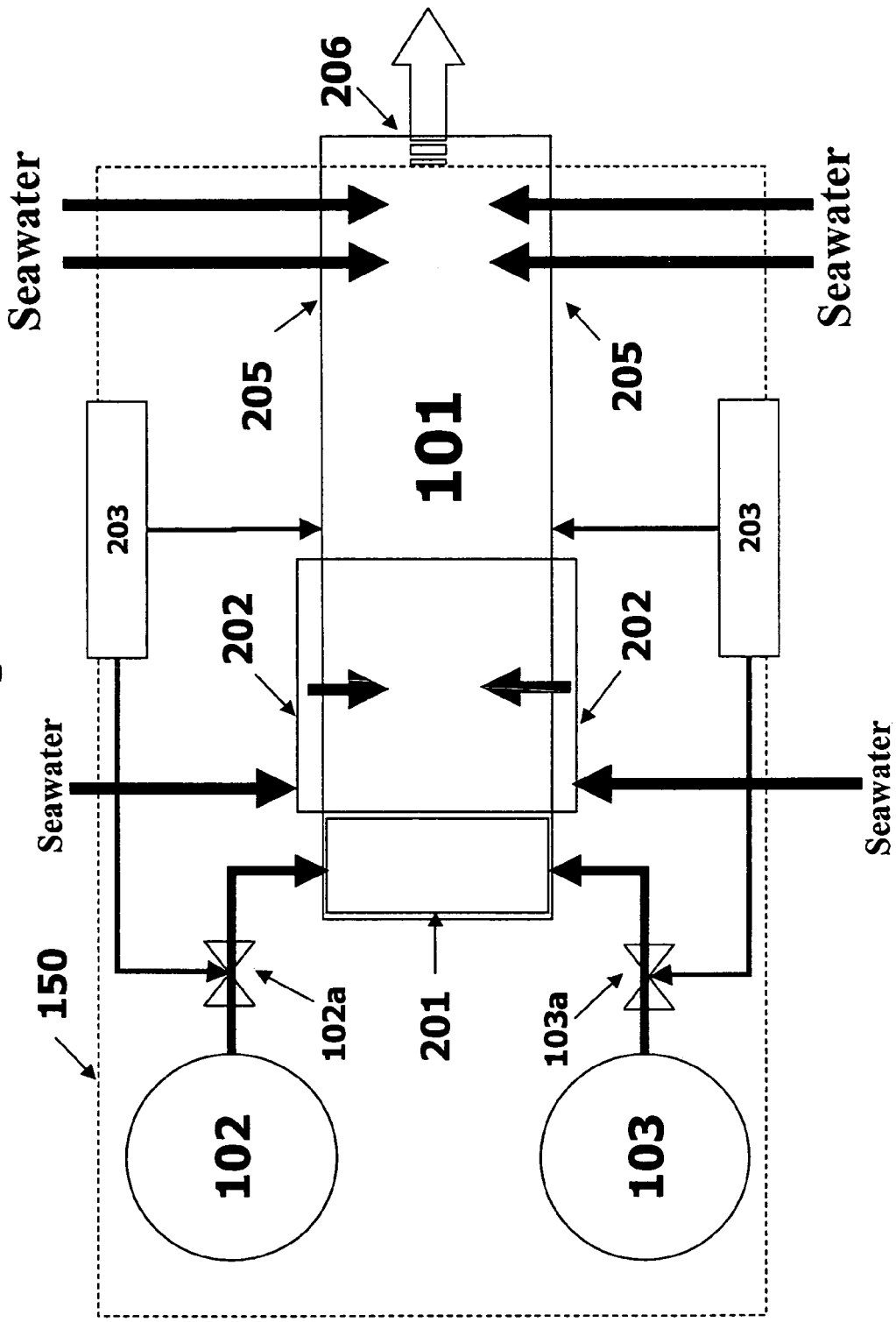
FIG. 2 illustrates a detailed schematic representation of a combustor for the propulsion generation system for an underwater vehicle of FIG. 1.

As shown in FIG. 2, a combustor 101 is in fluid communication with the hydrogen supply 102 and the oxygen supply 103. The combustor 101 uses oxygen from the oxygen supply 103 and hydrogen from the hydrogen supply 102 to initiate a combustion reaction between the oxygen and hydrogen. The hydrogen and oxygen are used as the fuel and oxidizer, respectively, and produce water vapor (high temperature steam) as a product of the combustion reaction. Appropriate control systems 102a, 103a are used to regulate the amount of hydrogen and oxygen, respectively, to be injected into an inlet 201 of the combustor 101. The amount of hydrogen and oxygen injected into the combustor 101 is proportional to the amount of power required by the underwater vehicle 150.

The combustion reaction between the hydrogen and oxygen produces high-temperature steam (water vapor). The steam travels from the point of the combustion reaction at inlet 201 within the combustor 101 to an exit at an ejecting area 206 of the combustor 101.

The high-temperature hydrogen-oxygen combustion reaction can be cooled by the introduction of seawater into areas 202 of the combustor 101. This water can be introduced through areas 202 into the combustor using seawater external to the underwater vehicle 150. This is done to prevent the combustion system from melting, as the hydrogen-oxygen combustion reaction generates very high flame temperatures. The introduction of seawater cools the reaction preventing damage to the combustor hardware.

The high-temperature steam produced by the hydrogen-oxygen combustion reaction can be cooled at areas 205 of the combustor 101 until it condenses to water by using additional seawater external to the underwater vehicle 150. A condenser can be used to condense the steam, or any other means for condensing the steam can be used. The condenser can be a part of the combustor 101, or separate from it. Seawater can be injected into the condenser or other means for condensing to condense the high-pressure steam into high-pressure water. For a system operating in an underwater vehicle, the system can take advantage of the nearly unlimited supply of cold, ambient water available exterior to the underwater vehicle for use as a coolant. Such cold water is nearly in infinite supply for an underwater vehicle.

The resulting saturated high-pressure water from condensing the high-pressure steam can then be ejected out of the combustor 101 to generate thrust for the underwater vehicle 150, thus propelling the underwater vehicle 150 forward. Any means for ejecting the water out of the combustor 101 can be used, such as a nozzle at area 206 of the combustor 101. Extra seawater can be brought in to eject out of the combustor 101 to increase the thrust of the underwater vehicle 150.

The combustor 101 can be a constant pressure combustion system or a constant volume (pressure rise) combustion system. Combustion systems such as candles, home heaters, gas ovens and stoves, etc., are deflagration-based combustion reactions, which are constant-pressure systems with sub-sonic flows. In contrast, constant volume combustion reactions generate an increase in pressure within the system, and may involve supersonic flows and shock waves. Thus, the output pressure from a constant volume reaction will be larger than the inlet pressure of the reactants, which will result in a higher thrust, leading to increased overall system efficiency.

As the operating depth of the underwater vehicle 150 changes, the combustor pressure can be increased or decreased to keep a constant velocity. This is due to the fact that the thrust generated is a function of the combustor pressure, the ambient pressure at the particular depth of the underwater vehicle 150, and the area of the exit 206:

$$\text{Thrust} = A_{exit} * (P_{combustor} - P_{ambient})$$

The pressure of the water surrounding the underwater vehicle 150 ($P_{ambient}$) is defined as $\rho gh$, in which $\rho$ is the density of the water, g is the specific gravity of the water and h is the depth from the surface.

Pressure sensors 203 measure the pressure of the water around the underwater vehicle 150, which depends on the depth of the underwater vehicle 150 in the water, and also measure the combustor pressure (pressure within the combustor 101). The thrust generated in area 206 of the combustor 101 is a function of the pressure difference between the combustion system exhaust and the pressure of the water around the underwater vehicle 150.

As the depth of the underwater vehicle 150 increases, so does the external pressure around the underwater vehicle 150. Pressure sensors 203 constantly measure the external pressure around the underwater vehicle 150 and the combustor pressure. One or more pressure sensors 203 can be used. To maintain a constant velocity with increasing depth, the thrust generated in area 206 would have to be increased, which can be accomplished by increasing the combustor pressure. Increasing the combustor pressure can be accomplished by increasing the amounts of hydrogen and oxygen flowing into the combustor 101 for the combustion reaction via control elements 102a, 103a, respectively, or by increasing the pressure of the hydrogen 102 and oxygen 103 into the combustor 101. Due to the back-pressure at the exit 206, this will increase the combustor pressure and result in larger thrust being generated.

The opposite is true to maintain a constant velocity for the underwater vehicle 150 if the depth of the underwater vehicle 150 is decreasing. To maintain a constant velocity with decreasing depth, the thrust generated in area 206 would have to be decreased by decreasing the combustor pressure. Thus, if the underwater vehicle 150 is rising, pressure sensors 203 determine that the pressure external to the underwater vehicle 150 is decreasing. Thus, the combustor pressure is decreased, by decreasing the amounts of oxygen and hydrogen used for the combustion reaction, or by decreasing the pressure of the hydrogen 102 and oxygen 103 into the combustor 101, resulting in less water being ejected out of the nozzle of the combustor 101. Thus, a constant velocity can be maintained for the underwater vehicle 150 while returning to the surface or during any time the depth of the underwater vehicle 150 decreases.

The nozzle of the combustor 101 could be a condensing eductor nozzle for ejecting water to increase the amount of thrust produced by the propulsion system by ejecting additional mass from the underwater vehicle 150. The purpose of the condensing eductor is that the exhaust pulls in seawater, thereby increasing the momentum of the exhaust stream (the high-pressure water that is ejected), and thus increasing the thrust of the underwater vehicle.

FIG. 3 shows another technique for increasing or decreasing the thrust of the underwater vehicle 150 by employing a variable geometry exhaust nozzle 210 as a nozzle for the combustor 101. As seen in FIG. 3, nozzle 210 of the combustor 101 has an initial area A1, and an exit area A2, which is smaller than the initial area A1. By employing such a nozzle 210, the water ejected out of the nozzle 210 at area A2 is higher than the velocity of the water at area A1, which is a well known fact using the principles of mass continuity:

$$\text{Mass flow rate} = \text{density} \times \text{area} \times \text{velocity}$$

In this case the density is the density of the exhaust gas and the velocity (V) is the velocity of the exhaust gas. Comparing the flow into area A1 and area A2:

$$\text{Mass flow rate} = \text{constant} = (\text{density} \times A1 \times \text{velocity})_{A1} = (\text{density} \times A2 \times \text{velocity})_{A2}$$

Since the mass flow into area A1 is the same as the mass flow into area A2, the equation of mass continuity can be used to determine the velocity of the fluid at area A2. The working fluid is water, which is an incompressible fluid so the density stays constant, but since the area is decreasing from area A1 to area A2, the velocity at area A2 must increase. On the other hand, if the area increased from area A1 to area A2, the velocity at area A2 would decrease.

Thus, the thrust of the underwater vehicle 150 at different depths can be increased/decreased by use of a variable geometry nozzle 210, and use of the pressure sensors 203. As depth increases/decreases, the exit area A2 of the nozzle 210 is increased/decreased to adjust the thrust, thus maintaining constant velocity of the underwater vehicle 150.

As mentioned above, the combustor 101 can be a constant pressure combustion system or a constant volume combustion system. One example of a constant volume (increasing pressure) based system is a Pulse Detonation Engine (PDE). A PDE-based combustion system provides an efficiency increase to the system over conventional (deflagration) combustion systems. A PDE-based combustion system is a pulsed system, in which detonation reactions generate a shock wave, which generates a very short duration pressure pulse. If a time-series of pressure pulses are created and at a sufficiently high enough frequency, the time integrated pressure will be larger than the initial pressure.

The Pulse Detonation Engine can use a Deflagration to Detonation Transition (DDT) based system. A DDT system uses a one-dimensional tube that is closed on one end. The fuel (hydrogen) and oxidizer (oxygen) are injected into the closed end. An energy source (such as a spark plug, etc) is used to ignite the mixture of the fuel and oxidizer. The combustion wave then begins to propagate towards the open end of the tube at subsonic speeds (deflagration). As the combustion wave propagates, it accelerates until a shock wave is formed and the flow transitions to sonic speeds (detonation). The tube is then purged and the process can then be repeated.

Alternatively, other type of engines (constant volume or constant pressure) can be used as the combustor 101, which employ similar combustion reactions between hydrogen and oxygen.

The propulsion system requires a fuel and oxidizer combination (hydrogen supply 102 and oxygen supply 103, respectively) that can be shared by both the regenerative fuel cell 100 and a combustor 101, and the products of the combustion reaction can be transformed back into the original reactants. These requirements are easily met by hydrogen and oxygen, which when reacted in stoichiometric proportion produce water vapor:

$$H_2 + \tfrac{1}{2}O_2 \rightarrow H_2O$$

In a combustion system, thrust can be generated from the combustion reaction, and electrical power can be generated from the regenerative fuel cell 100 using the same reactants. In the present system, the reaction product can be converted back into the reactants. In this case the reaction product, water ($H_2O$) stored in the water supply 105, can be chemically reduced into the constituent hydrogen ($H_2$) and oxygen ($O_2$) with the addition of electricity:

$$H_2O + (e^-) \rightarrow H_2 + \tfrac{1}{2}O_2$$

This process is known as electrolysis. In the present invention, the stored water in the water supply 105 can be converted back into $H_2$ and $O_2$ by running the regenerative fuel cell 100 as an electrolysis system, which would require electrical power to be fed by an external source (overboard power supply 112). If an external power source such as the overboard power supply 112 is used to feed electricity back into the regenerative fuel cell 100, the regenerative fuel cell 100 would reduce the water from the water supply 105 back into $H_2$ and $O_2$. Thus, this is a regenerative system, in which an external power source is used to re-charge the regenerative fuel cell 100. After the electrolysis reaction, the resultant hydrogen would be stored in the hydrogen supply 102 and the resultant oxygen would be stored in the oxygen supply 103.

The regenerative fuel cell 100 can operate independently of the combustor 101 or simultaneously with the combustor 101. The regenerative fuel cell 100 is used for operational modes requiring low power while the combustor 101 is off or remains idle. The combustor 101 supplements the regenerative fuel cell 100 for operational modes requiring high power. The regenerative fuel cell 100 continues to operate at all times to provide the basic minimum power required by the underwater vehicle 150. Low power can be used when a low speed is required, while a high power can be used when a high speed is required.

The above descriptions of the present invention are only preferred embodiments of the present invention. Various other combinations of propulsion systems are also possible, in which different types of combustors (constant pressure systems or constant volume systems) are used in combination with the regenerative fuel cell. The combustor can have various types of nozzles for providing the thrust to the vessel. The fuel cell can be a unitized or discrete regenerative fuel cell. A discrete regenerative fuel cell system includes separate fuel cell and electrolyzer stack components, where a unitized regenerative fuel cell system combines the fuel cell and electrolyzer function into one stack. Further, the underwater vehicle can be either manned or unmanned.

The present invention provides several advantages that solves the problems with prior art methods. A regenerative fuel cell is combined with a combustor to create an open-loop propulsion system. The open-loop system allows for a simpler and smaller mechanical system, with fewer moving parts, than a closed-loop system, which must generate work from an exhaust stream, generate thrust from this work, as well as capture and store the exhaust fluid. No turbomachinery is required (turbine, gears, generator, motors, etc.) to generate thrust. The use of an open cycle provides high speed underwater propulsion.

Further, the system only requires an electrical connection to regenerate the fuel supply. Thus, a simple electrical connection is able to refuel the vehicle and it does not require any additional fuel. By integrating the combustor with a closed loop $H_2/O_2$ fuel cell system, the fuel tanks for the combustor are refueled by simply adding water to the onboard storage tank, or using the existing water in the water supply. When the vessel is docked, the onboard electrolyzer could then convert the $H_2O$ into $H_2$ and $O_2$ for use by the propulsion system.

Also, the use of hydrogen and oxygen are important as they would allow this propulsion system to be integrated into a vessel that already uses hydrogen and oxygen to power other systems, such as a fuel cell. Another important reason for using hydrogen and oxygen is that the combustion product (steam) can be easily condensed by injecting seawater into the combustor exhaust. This could then allow for the use of a condensing eductor nozzle to increase the amount of thrust produced by the propulsion system.

The dual power systems (regenerative fuel cell and combustor) allow for both normal power levels and boost or high-load conditions. The two power cycles provide very different power outputs. The fuel cell provides nominal steady power when the underwater vehicle requires a low speed for base-load applications. The combustor provides high power output when the underwater vehicle requires a high speed, by supplementing the fuel cell when a high speed is required.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A propulsion generation system for an underwater vehicle comprising:
    a hydrogen supply;
    an oxygen supply;
    a combustor in fluid communication with the hydrogen supply and oxygen supply, the combustor forming high-pressure steam from a combustion reaction in the combustor between hydrogen from the hydrogen supply and oxygen from the oxygen supply;
    means for condensing the high-pressure steam into high pressure water; and
    means for ejecting the high-pressure water from the combustor to generate thrust for the underwater vehicle.

2. The propulsion generation system for an underwater vehicle of claim 1, wherein the means for condensing comprises a condenser.

3. The propulsion generation system for an underwater vehicle of claim 2, wherein the means for condensing includes injecting seawater into the condenser.

4. The propulsion generation system for an underwater vehicle of claim 2, wherein the condenser is within the combustor.

5. The propulsion generation system for an underwater vehicle of claim 1, further comprising a regenerative fuel cell in fluid communication with the hydrogen supply and the oxygen supply for powering the underwater vehicle separately or in combination with the combustor.

6. The propulsion generation system for an underwater vehicle of claim 5, wherein the regenerative fuel cell uses the hydrogen from the hydrogen supply and oxygen from the oxygen supply to generate direct current electricity to drive a propulsion system for the underwater vehicle.

7. The propulsion generation system for an underwater vehicle of claim 1, wherein the combustor comprises a constant pressure system.

8. The propulsion generation system for an underwater vehicle of claim 1, wherein the combustor comprises a constant volume system.

9. The propulsion generation system for an underwater vehicle of claim 7, wherein the constant volume system comprises a Pulse Detonation Engine.

10. The propulsion generation system for an underwater vehicle of claim 8, wherein the Pulse Detonation Engine uses a Deflagration to Detonation transition based system.

11. The propulsion generation system for an underwater vehicle of claim 1, further comprising one or more pressure sensors for monitoring a pressure around an exterior of the underwater vehicle and a combustion pressure within the combustor.

12. The propulsion generation system for an underwater vehicle of claim 1, wherein the means for ejecting the high-pressure water comprises a nozzle of the combustor.

13. The propulsion generation system for an underwater vehicle of claim 12, wherein the nozzle comprises a condensing eductor nozzle to increase the amount of thrust generated for the underwater vehicle.

14. The propulsion generation system for an underwater vehicle of claim 12, wherein the nozzle comprises a variable geometry nozzle.

15. The propulsion generation system for an underwater vehicle of claim 1, further comprising an electrolyzer for breaking down water from a water supply into hydrogen and oxygen.

16. The propulsion generation system for an underwater vehicle of claim 15, wherein the hydrogen is stored in the hydrogen supply and the oxygen is stored in the oxygen supply.

17. The propulsion generation system for an underwater vehicle of claim 15, wherein the electrolyzer uses electricity from an outside power supply to reduce the water in the water supply into hydrogen and oxygen.

18. The propulsion generation system for an underwater vehicle of claim 1, wherein the underwater vehicle can be either manned or unmanned.

19. A propulsion generation method for an underwater vehicle, the method comprising:
    initiating a combustion reaction between hydrogen and oxygen to form high-pressure steam in a combustor as a product of the combustion reaction;
    condensing the high-pressure steam in the combustor into high-pressure water; and
    ejecting the high-pressure water out of the combustor to generate thrust for the underwater vehicle.

20. The propulsion generation method for an underwater vehicle of claim 19, wherein the condensing step comprises injecting seawater into the combustor.

21. The propulsion generation method for an underwater vehicle of claim 19, further comprising simultaneously powering the underwater vehicle by a regenerative fuel cell.

22. The propulsion generation method for an underwater vehicle of claim 21, further comprising generating direct current electricity from the regenerative fuel cell to drive a propulsion system of the underwater vehicle.

23. The propulsion generation method for an underwater vehicle of claim 19, further comprising monitoring pressure around an exterior of the underwater vehicle and a combustion pressure within the combustor.

24. The propulsion generation method for an underwater vehicle of claim 19, further comprising increasing the thrust of the underwater vehicle as depth increases to maintain a constant velocity.

25. The propulsion generation method for an underwater vehicle of claim 24, wherein the step of increasing the thrust comprises increasing combustor pressure by increasing the amount of the hydrogen and oxygen used in the combustion reaction.

26. The propulsion generation method for an underwater vehicle of claim 19, further comprising decreasing the thrust of the underwater vehicle as depth decreases to maintain a constant velocity.

27. The propulsion generation method for an underwater vehicle of claim 24, wherein the step of decreasing the thrust comprises decreasing combustor pressure by decreasing amounts of the hydrogen and oxygen in the combustion reaction.

28. The propulsion generation method for an underwater vehicle of claim 19, further comprising using a nozzle of the combustor to eject the water out of the combustor.

29. The propulsion generation method for an underwater vehicle of claim 28 wherein the nozzle is a condensing eductor nozzle.

30. The propulsion generation method for an underwater vehicle of claim 28 wherein the nozzle is a variable geometry nozzle.

31. The propulsion generation method for an underwater vehicle of claim 19, further comprising breaking down water from a water supply into hydrogen and oxygen.

32. The propulsion generation method for an underwater vehicle of claim 31, further comprising using electricity from an outside power supply to break down the water from the water supply into hydrogen and oxygen.

* * * * *